US012762801B2

(12) United States Patent
Xu et al.

(10) Patent No.: US 12,762,801 B2
(45) Date of Patent: Oct. 13, 2026

(54) RFID-BASED AUGMENTED REALITY

(71) Applicant: International Business Machines Corporation, Armonk, NY (US)

(72) Inventors: Nuo Xu, Hangzhou (CN); Yuan Li, Ningbo (CN); Shen Qi, Ningbo (CN); Jia Mao, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 326 days.

(21) Appl. No.: 17/932,570

(22) Filed: Sep. 15, 2022

(65) Prior Publication Data

US 2024/0096027 A1 Mar. 21, 2024

(51) Int. Cl.

*G06T 19/00* (2011.01)
*G06K 7/10* (2006.01)
*G06T 15/20* (2011.01)

(52) U.S. Cl.

CPC ........ *G06T 19/006* (2013.01); *G06K 7/10366* (2013.01); *G06T 15/20* (2013.01)

(58) Field of Classification Search

None
See application file for complete search history.

(56) References Cited

U.S. PATENT DOCUMENTS

2009/0215536 A1* 8/2009 Yee ...................... A63F 13/211 463/30
2011/0065496 A1* 3/2011 Gagner .................. G06F 3/011 463/43
2011/0095865 A1 4/2011 Harasti et al.
2013/0147836 A1* 6/2013 Small .................... G06T 19/006 345/633
2013/0228620 A1* 9/2013 Ahern .................. H04N 13/178 235/439
2014/0289607 A1* 9/2014 Ko ........................ G06F 16/954 715/234

(Continued)

FOREIGN PATENT DOCUMENTS

WO 2022067836 A1 4/2022

OTHER PUBLICATIONS

Pei-Huang Diao et al., "Marins: A Mobile Smartphone AR System for Pathfinding in a Dark Environment," Sensors, Dated: Oct. 13, 2018, pp. 1-14.

(Continued)

*Primary Examiner* — David H Chu

(74) *Attorney, Agent, or Firm* — Kelsey M. Skodje, Esq.; Kevin P. Radigan, Esq.; Heslin Rothenberg Farley & Mesiti P.C.

(57) ABSTRACT

Techniques are provided for performing an RFID-based localization and mapping of an environment. In one embodiment, the techniques involve generating identifying information of a first virtual object based on a RFID tag scan, retrieving a first virtual object model or a first object model data based on the identifying information of the first virtual object, generating display data of the first virtual object model or the first object model data relative to a position of an augmented reality system, and rendering the first virtual object model or the first object model data on a display based on the display data.

17 Claims, 5 Drawing Sheets

(56) References Cited

U.S. PATENT DOCUMENTS

| | | | | |
|---|---|---|---|---|
| 2014/0368542 | A1* | 12/2014 | Tawara | G06T 19/006 345/633 |
| 2015/0312426 | A1 | 10/2015 | Schoner et al. | |
| 2016/0171777 | A1 | 6/2016 | Todeschini et al. | |
| 2017/0103440 | A1* | 4/2017 | Xing | H04W 12/06 |
| 2020/0257721 | A1 | 8/2020 | McKinnon et al. | |
| 2021/0083992 | A1* | 3/2021 | Didear | H04L 49/70 |
| 2021/0142575 | A1* | 5/2021 | Taylor | H04N 13/128 |
| 2025/0124541 | A1* | 4/2025 | Beutel | G06T 7/0004 |

OTHER PUBLICATIONS

Prabin Kumar Panigrahi et al., "Localization strategies for autonomous mobile robots: A review," Journal of King Saud University—Computer and Information Sciences, ScienceDirect, Dated: Feb. 27, 2021, pp. 1-21.

Bakkiam David Deebak et al., "Aerial and underwater drone communication: potentials and vulnerabilities," Drones in Smart-Cities, Elsevier, Year: 2020, pp. 1-26.

Min Jiang et al., "A Survey of Underwater Acoustic SLAM System," Researchgate, Dated: Aug. 2019, pp. 1-13.

Martinelli, F, "Simultaneous Localization and Mapping Using the Phase of Passive UHF-RFID Signals," J Intell Robot Syst 94, 711-725 (2019). https://doi.org/10.1007/s10846-018-0903-8 [Abstract Only].

R. Morales et al., "An Underwater Augmented Reality system for commercial diving operations," IEEE Source, Dated: Nov. 2009, pp. 1-9.

Jiun-Fu Chen et al., "Simultaneous localization and mapping using a short-range passive RFID reader with sparse tags in large environments," IEEE, Dated: Oct. 26-28, 2010, pp. 1-3 [Abstract Only].

Benelli et al., "RFID Under Water: Technical Issues and Applications", https://www.researchgate.net/publication/290109978_RFID_Under_Water_Technical_Issues_and_Applications, Jun. 5, 2013, 19 pages.

* cited by examiner

RFID-BASED AUGMENTED REALITY

BACKGROUND

The present invention relates to augmented reality (AR) systems, and more specifically, to AR systems that implement radio frequency identification (RFID) and simultaneous localization and mapping (SLAM) technology to operate in harsh environments.

SUMMARY

A method is provided according to one embodiment of the present disclosure. The method includes generating identifying information of a first virtual object based on a RFID tag scan; retrieving a first virtual object model or a first object model data based on the identifying information of the first virtual object; generating display data of the first virtual object model or the first object model data relative to a position of an augmented reality system; and rendering the first virtual object model or the first object model data on a display based on the display data.

A system is provided according to one embodiment of the present disclosure. The system includes a processor; a display; and memory or storage comprising an algorithm or computer instructions, which when executed by the processor, performs an operation that includes: generating identifying information of a first virtual object based on a RFID tag scan, retrieving a first virtual object model or a first object model data based on the identifying information of the first virtual object, generating display data of the first virtual object model or the first object model data relative to a position of the display, and rendering the first virtual object model or the first object model data on the display based on the display data.

A computer-readable storage medium having computer-readable program code embodied therewith, the computer-readable program code executable by one or more computer processors to perform an operation, is provided according to one embodiment of the present disclosure. The operation includes generating identifying information of a first virtual object based on a RFID tag scan; retrieving a first virtual object model or a first object model data based on the identifying information of the first virtual object; generating display data of the first virtual object model or the first object model data relative to a position of an augmented reality system; and rendering the first virtual object model or the first object model data on a display based on the display data.

DETAILED DESCRIPTION

Figure 1:
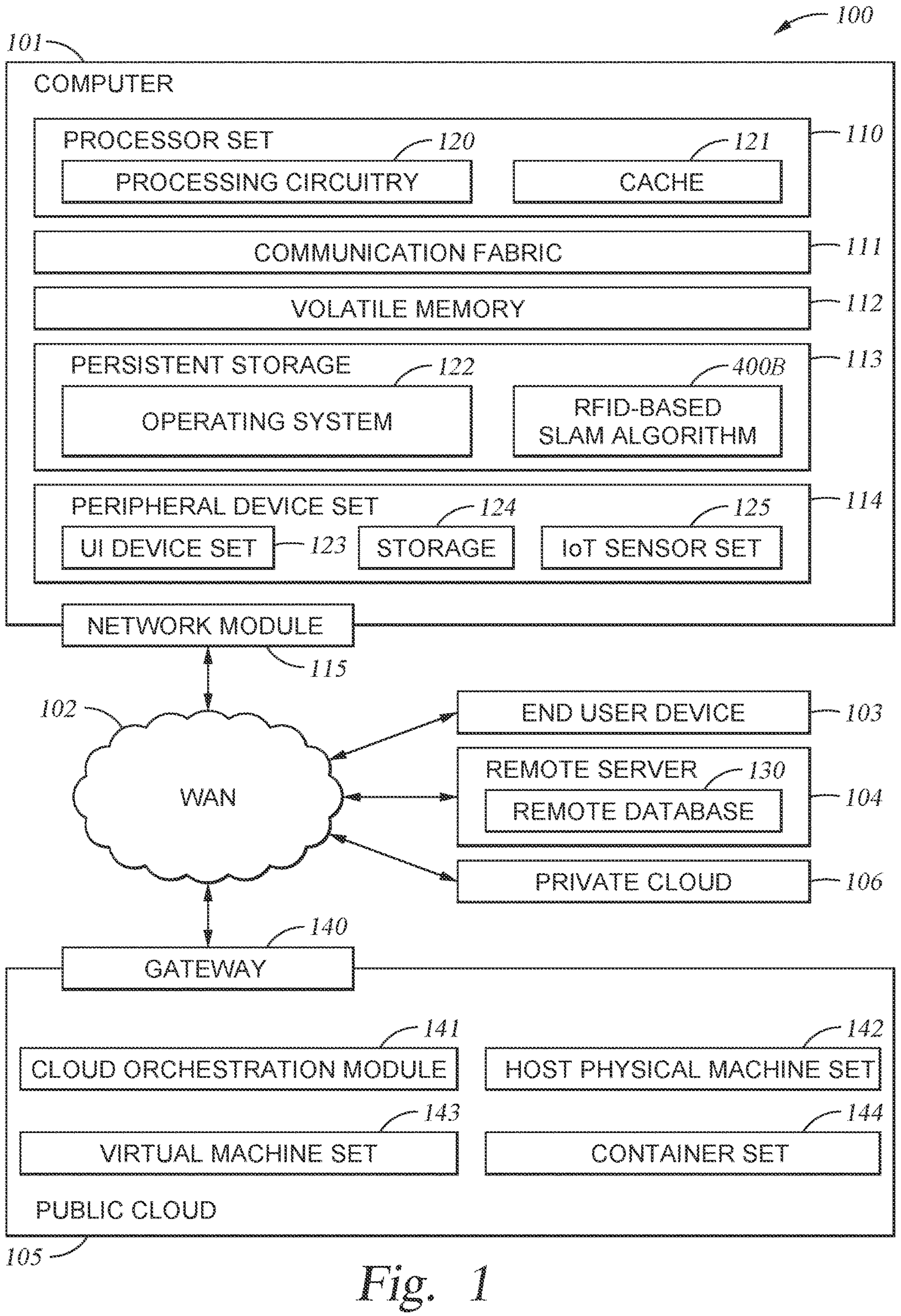
FIG. 1 illustrates a computing environment, according to one embodiment.

Traditional AR systems are designed to operate in well-lit, open-space environments. Such AR systems typically include a camera to track the surrounding environment, and implement a visual-based SLAM algorithm to map the environment and track the position of the camera within this mapping. However, because cameras depend on sufficient light conditions to properly capture the surrounding environment, AR systems that use visual-based SLAM technology provide poor performance in low-light, enclosed, or otherwise harsh environments. For example, visual-based SLAM technology may provide poor tracking and mapping functionality for underwater environments, or in underground tunnels.

Embodiments of the present disclosure increase the performance of AR systems in harsh environments by implementing a new RFID-based SLAM algorithm. In one embodiment, an RFID transmission system scans RFID tags that cover objects positioned in a harsh environment. The RFID-based SLAM algorithm can use the scans to identify the objects, portray properly scaled models of the objects relative to an AR system display (if the objects are not visible in the environment), and overlay object data over the objects or the models as shown on the display.

One benefit of the disclosed embodiments is to allow for the use of AR systems in harsh environments. Embodiments of the present disclosure provide accurate scaling and positioning of virtual representations of real-world objects ("virtual objects"), relative to the display. This allows end-users of the AR system to interact with the real-world objects via interaction with the virtual objects in environments where there is low visibility of the real-world objects through the display.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 illustrates a computing environment 100, according to one embodiment. Computing environment 100 contains an example of an environment for the execution of at least some of the computer code involved in performing the inventive methods, such as a new spacing and mapping algorithm as shown in block 400B. In addition to block 400B, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 400B, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 400B in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 400B typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
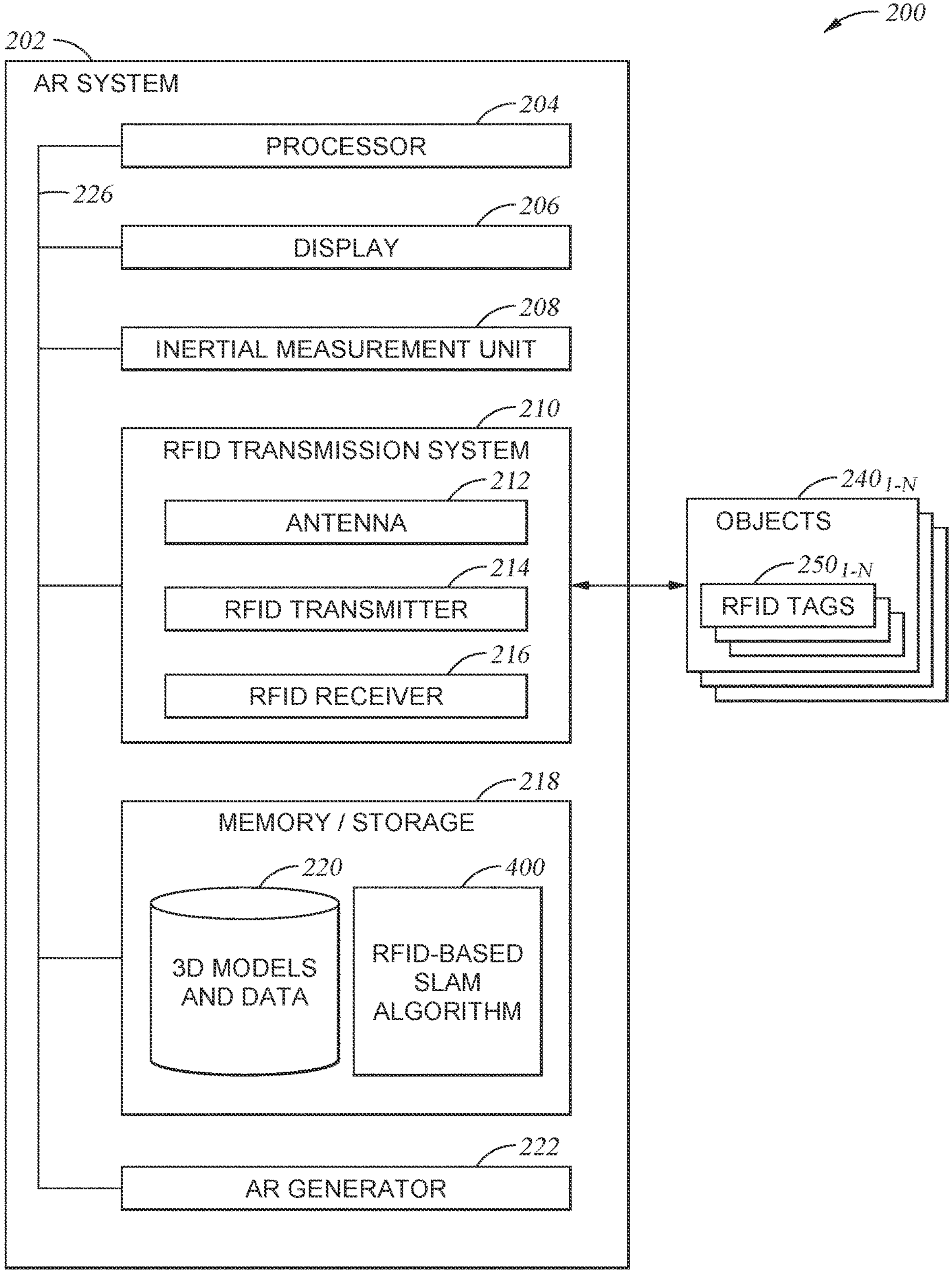
FIG. 2 illustrates an RFID-based AR system environment, according to one embodiment.

FIG. 2 illustrates an RFID-based AR system environment 200, according to one embodiment. In the illustrated embodiment, the AR system 202 includes a processor 204, display 206, inertial measurement unit (IMU) 208, RFID transmission system 210, and memory or storage 218. Not all components of the AR system 202 are shown.

The processor 204 generally obtains instructions and data via a bus 226 from memory or storage 218. AR system 202 is generally under the control of an operating system (OS) suitable to perform or support the functions or processes disclosed herein. The processor 204 is a programmable logic device that performs instruction, logic, and mathematical processing, and may be representative of one or more CPUs. The processor may execute one or more algorithms, instruction sets, or applications in the memory or storage 218 to perform the functions or processes described herein.

The memory or storage 218 can be representative of hard-disk drives, solid state drives, flash memory devices, optical media, and the like. The storage can also include structured storage, e.g., a database. In addition, the memory or storage 218 may be considered to include memory physically located elsewhere; for example, on another computer communicatively coupled to the AR system 202 via the bus or a network.

The AR system 202 can include a network interface to connect to other computers (e.g., distributed databases, servers, or web-hosts) via a network. The network can comprise, for example, the Internet, a local area network, a wide area network, or a wireless network. The network can include any combination of physical transmission cables, optical transmission fibers, wireless transmission, routers, firewalls, switches, gateway computers and/or edge servers. The network interface may be any type of network communications device allowing the AR system 202 to communicate with other computers via the network. The network interface may exchange data with the network.

The display 206 may include any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology.

In one embodiment, the display 206 includes a transmissive or transparent screen that permits light emitted by light sources to pass through the display 206 from a real-world environment. Thus, without AR content, the real-world environment can appear in a similar state whether viewed through the display 206 or without the display 206.

The IMU 208 can include an accelerometer, a gyroscope, and a magnetometer, to generate positional and movement data of the AR system 202 across six or nine degrees of freedom. The accelerometer measures changes in velocity experienced by the AR system 202. The gyroscope measures the orientation of the AR system 202 in a real-world environment. The magnetometer measures properties of a magnetic field in the real-world environment.

The RFID transmission system 210 includes an RFID transmitter 214, RFID receiver 216, and at least one antenna 212. In one embodiment, the RFID transmitter 214 and RFID receiver 216 are each coupled to the antenna 212 to enable transmission of radio wave signals between the RFID transmission system 210 and RFID tags 250$_{1-N}$ that cover the objects 240$_{1-N}$. Information from the RFID tags 250$_{1-N}$ are used to generate 3D models and object data 220 used in an RFID-based SLAM algorithm 400B. This process is described in greater detail in FIG. 3 below.

The memory/storage 218 stores the 3D models and object data 220 of the objects 240$_{1-N}$, and the RFID-based SLAM algorithm 400B. In one embodiment, the 3D models and object data 220, are stored in a local database on the AR system 202. In another embodiment, the 3D models and object data 220 are stored on a server or database communicatively coupled to the AR system.

In one embodiment, the RFID-based SLAM algorithm 400B is a set of computer instructions executed by the processor 204. The RFID-based SLAM algorithm 400B can use the RFID transmission system 210 to scan the RFID tags 250$_{1-N}$, and use information received from the RFID tags 250$_{1-N}$ to identify 3D models and data of the objects 240$_{1-N}$, that include the RFID tags 250$_{1-N}$. The RFID-based SLAM algorithm 400B can also determine when environmental conditions may impede visibility of the objects 240$_{1-N}$, and instruct an AR generator 222 to project the 3D models onto the display 206. The RFID-based SLAM algorithm 400B can also instruct the AR generator 222 to overlay object data over the 3D models, or over the objects 240$_{1-N}$, as seen via the display 206. Further, the RFID-based SLAM algorithm 400B can determine changes in the position and distance of the objects 240$_{1-N}$ in real time, and instruct the AR generator 222 to update the projections and overlays on the display 206 accordingly. These features are described in greater detail in FIG. 4B below.

Figure 3:
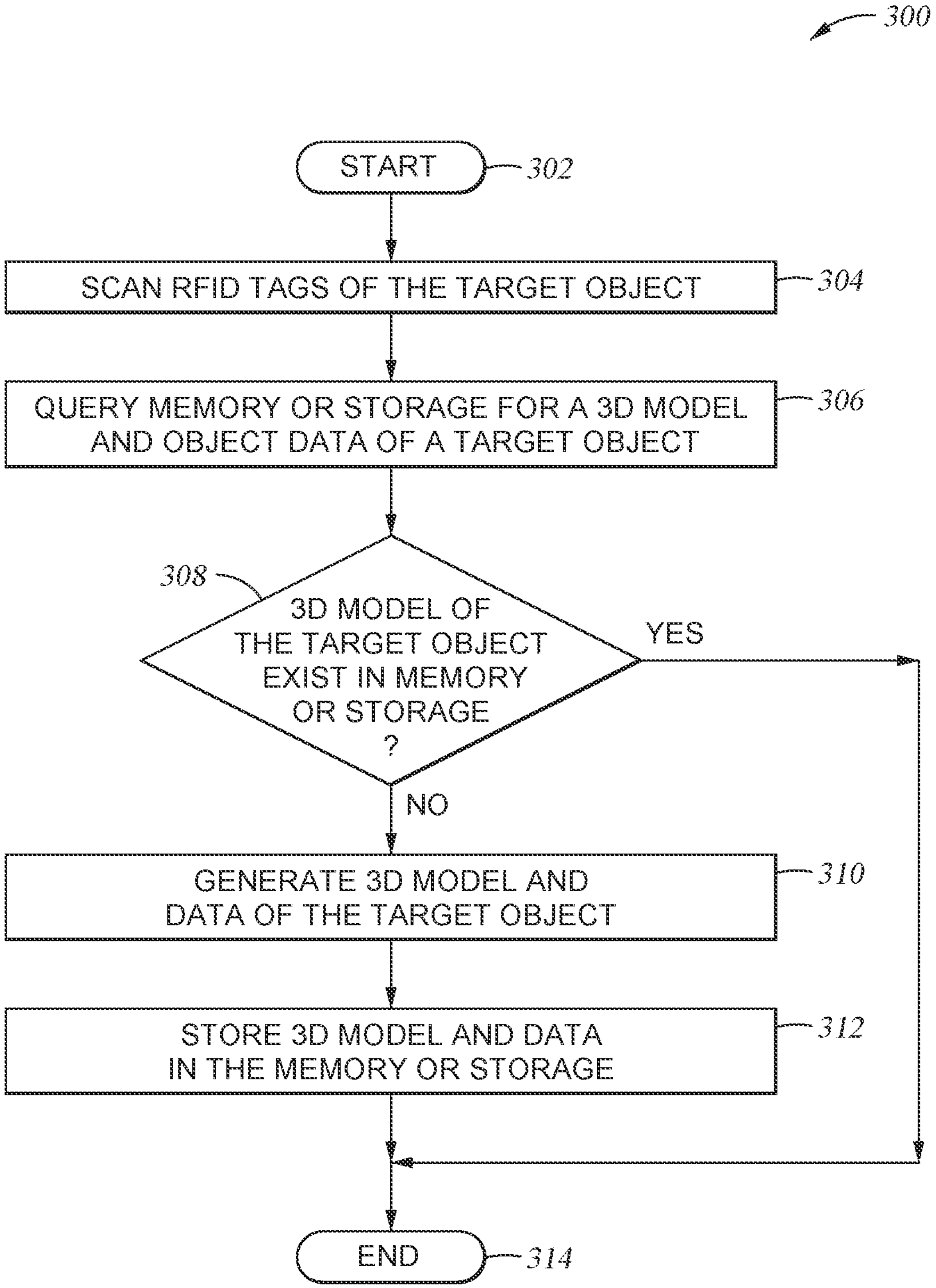
FIG. 3 illustrates a flowchart of a method for generating 3D object models and object data, according to one embodiment.

FIG. 3 illustrates a flowchart of a method 300 for generating 3D object models and object data, according to one embodiment. This method 300 represents one example by which the 3D models and object data 220 are generated for use by the RFID-based SLAM algorithm 400B.

The method 300 begins at block 302. As referenced herein, a "target object" is an object whose 3D model and object data are made available for use by the RFID-based SLAM algorithm 400B. In one embodiment, the target object is covered with selective, non-random placements of RFID tags 250$_{1-N}$. Each of the RFID tags 250$_{1-N}$ includes information such as a material composition of the target object, tag position information, UUID information, physical dimensions and measurements of the target object, and the like.

At block 304, the computer 101 scans the RFID tags 250$_{1-N}$ on the target object. Each of the RFID tags 250$_{1-N}$ includes a 3D coordinate system to help identify the absolute and local position of the tag on the target object. In one embodiment, the UUID of a tag indicates its absolute position. For instance, the UUID can include coordinates to show that the tag is positioned at a specific location on the bottom of the target object. The tag can also include local positional data, which indicates the position of the tag relative to the position of another tag. In this manner, the selective placements of the RFID tags 250$_{1-N}$ on the target object at locations that capture identifying features when scanned can aid in identifying or generating the 3D model.

At block 306, the computer 101 queries the persistent storage 113 or the memory/storage 218 for a 3D model and object data of the target object. In one embodiment, the 3D model and object data of the target object is included in a computer aided design and drafting software file.

At block 308, upon determining that the 3D model and object data exist in the queried locations, the method 300 proceeds to block 314, where the method 300 ends. However, if the 3D model and object data do not exist in the queried locations, the method 300 proceeds to block 310.

At block 310, the computer 101 generates the 3D model and data of the target object. In one embodiment, the computer 101 can use information from the RFID tags 250$_{1-N}$ to generate the form and structure of the 3D model. That is, the RFID tags 250$_{1-N}$ are selectively placed in locations on the target object that provide sufficient information about the physical dimensions, features, and movements to generate a representative virtual object. The virtual object can be accompanied by other data from the RFID tags 250$_{1-N}$, such as the material composition of the target object, tag position information, UUID information, physical dimensions and measurements of the target object, and the like.

At block 312, the computer 101 stores the 3D model and data of the target object in the persistent storage 113 or the memory/storage 218, which makes the model and data available for use by the RFID-based SLAM algorithm 400B. The method 300 ends at block 314.

Figure 4A:
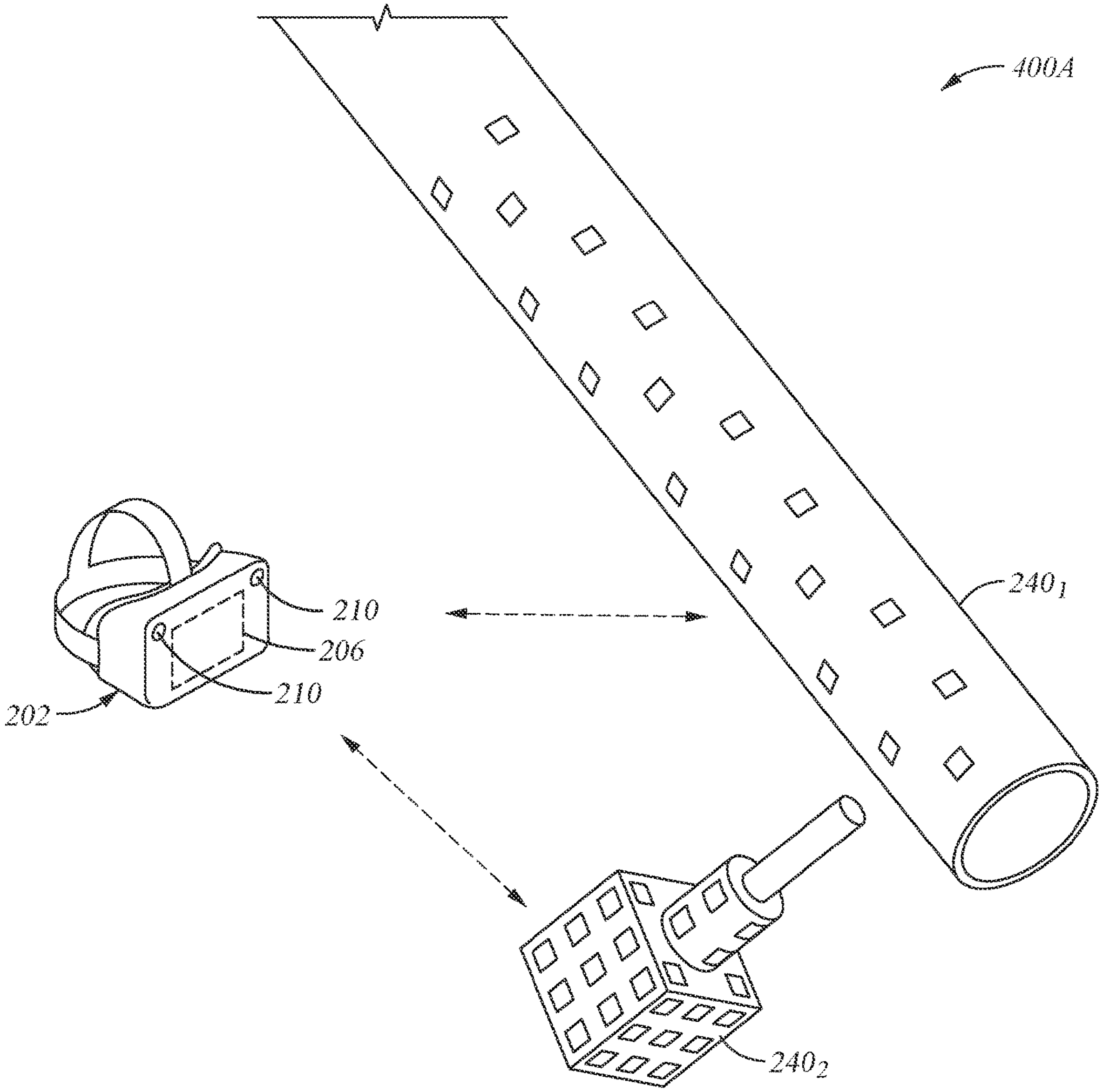
FIG. 4A illustrates an RFID-based AR system environment, according to one embodiment.
Figure 4B:
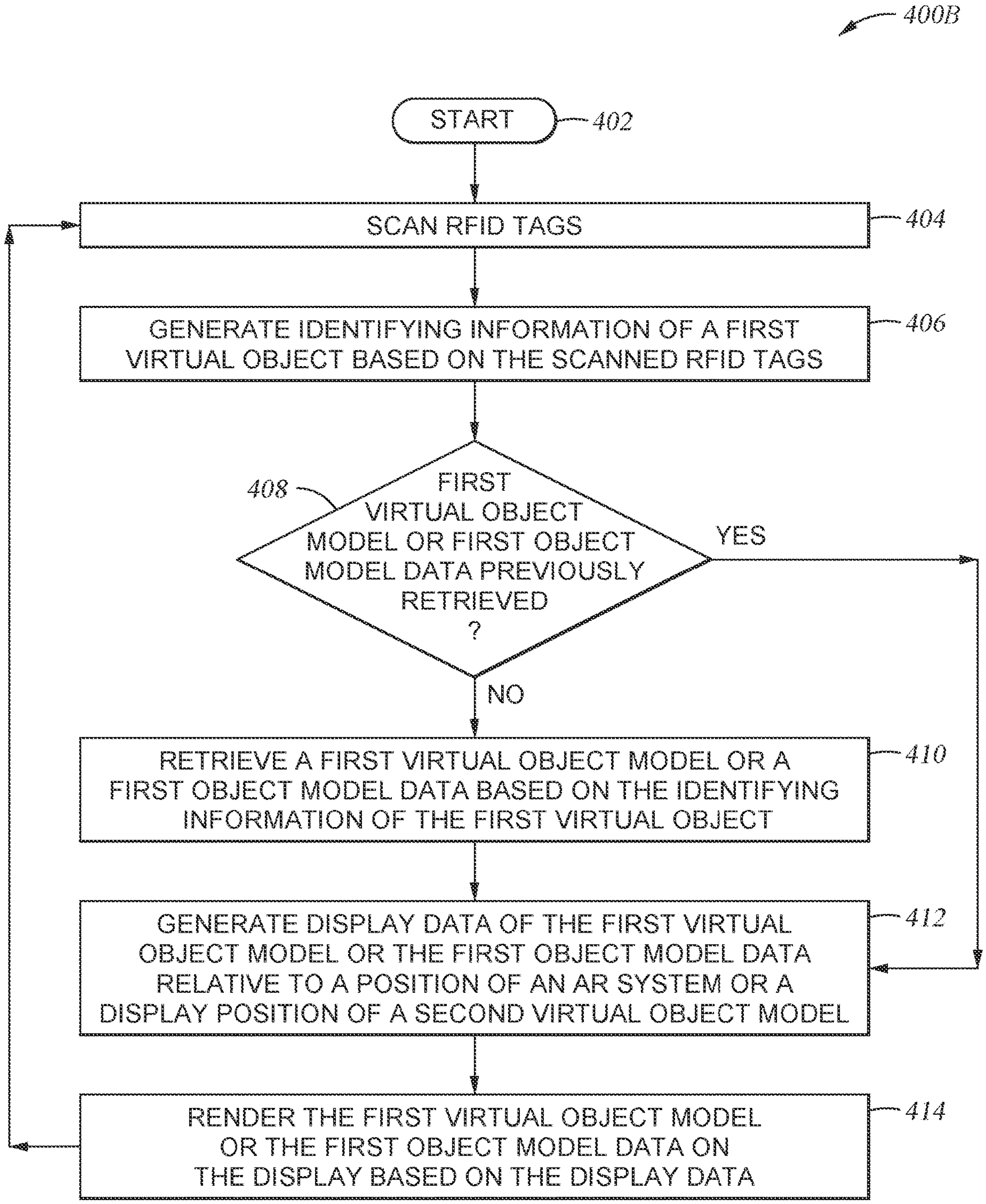
FIG. 4B illustrates a flowchart of a method of implementing an RFID-based SLAM algorithm, according to one embodiment.

FIG. 4A illustrates an RFID-based AR system environment 400A, according to one embodiment. FIG. 4B illustrates a flowchart of a method of implementing an RFID-based SLAM algorithm 400B, according to one embodiment. FIG. 4A is explained in conjunction with FIG. 4B.

FIG. 4A depicts the AR system 202 as a head mounted unit that includes display 206 and RFID transmission system 210. The AR system environment 400A also includes real-world object 240$_1$ and real-world object 240$_2$, each of which includes RFID tags 250$_{1-N}$. In the illustrated embodiment, object 240$_1$ represents a section of an underwater oil pipeline. Object 240$_2$ represents a tool used to repair damage to object 240$_2$. The method begins at block 402.

At block 404, the AR system 202 scans the RFID tags 250$_{1-N}$. As described in FIG. 2, the RFID transmission system 210 includes an RFID transmitter 214, RFID receiver 216, and at least one antenna 212. In one embodiment, the RFID transmitter 214 generates a radio wave, and transmits the wave to object 240$_1$ via the antenna 212. The RFID tags 250$_{1-N}$ on objects 240$_1$ can include information such as the tag UUIDs, and coordinates for the positions of the RFID tags 250$_{1-N}$, positional information of the RFID tags 250$_{1-N}$ relative to surrounding tags (which may include the RFID tags 250$_{1-N}$ on any objects in the environment 200), material composition of object 240$_1$, physical dimensions and measurements of object 240$_1$, and the like. When the radio wave triggers the RFID tags 250$_{1-N}$, this information is transmitted back to the RFID receiver 216.

At block 406, the AR system 202 generates identifying information of a first virtual object based on the scanned RFID tags 250$_{1-N}$. In one embodiment, the AR system 202 generates fixed feature points in a feature points cloud based on the information from multiple scanned RFID tags 250$_{1-N}$. The AR system 202 then determines identifying information used to identify the first virtual object based on the feature points.

A traditional feature points cloud of a visual-based SLAM algorithm marks identifying aspects (i.e., feature points) of a randomly chosen feature or space in an image frame recorded by a camera. The algorithm then attempts to identify the same features in another image frame, and compare the features points of the frames to determine how the camera has moved relative to the feature points.

In one embodiment of the present disclosure, the feature points of the feature points cloud are generated using the UUID and positional data of the RFID tags 250$_{1-N}$ on object 240$_1$. Therefore, because the RFID tags 250$_{1-N}$ are in fixed locations on the object, the feature points are also fixed in a given iteration of the feature points cloud. Put differently, the AR system 202 can use information from the scanned RFID tags 250$_{1-N}$ (e.g., the UUIDs, location coordinates, relative positional data, and the like) to generate fixed feature points that accurately represent the placements of the scanned RFID tags 250$_{1-N}$ in the feature points cloud.

Further, as previously discussed in FIG. 3, the RFID tags 250$_{1-N}$ are selectively placed to allow an RFID scan to capture information about the real-world object. In the embodiment illustrated in FIG. 4A, the feature points generated from the RFID tags 250$_{1-N}$ on object 240$_1$ are used to determine identifying information such as the physical dimensions and curvatures, and other physical features, of object 240$_1$.

At block 408, if the first virtual object model or first object model data have not been previously retrieved, the method proceeds to block 410. At block 410, the AR system 202 retrieves a first virtual object model or a first object model data based on the identifying information of the first virtual object. In the embodiment illustrated in FIG. 4A, the AR system 202 uses the identifying information established from the feature points to query the storage/memory 218 for the virtual object model and object model data corresponding to object 240$_1$. The first object model data can include information such as the names and location coordinates of the UUIDs of the RFID tags 250$_{1-N}$ on the object 240$_1$, distances between the RFID tags 250$_{1-N}$, material composition or physical dimensions or physical features of the object 240$_1$ in the areas near the tags, common points of failure or areas of particular structural importance, and the like.

Returning to block 408, if the first virtual object model or first object model data have been previously retrieved, the method proceeds to block 412. At block 412, the AR system 202 determines display data of the first virtual object model or the first object model data relative to a position of an AR system or a display position of a second virtual object model. The display data can include a scale size, display location, physical orientation, and the like, of the first virtual object model on the display 206.

In one embodiment, the AR system 202 uses the feature points to determine a distance between the AR system 202 and object 240$_1$. This distance can be used to track the movement and physical orientation of the first virtual object model, and to adjust the display data of the first virtual object model and the first object model data.

In addition, as previously described in FIG. 2, the IMU 208 can generate positional and movement data of the AR system 202 across six or nine degrees of freedom. This data can also be used to adjust the display data of the first virtual object model and the first object model data.

In the embodiment illustrated in FIG. 4A, the above-described blocks are also performed for object 240$_2$. In one embodiment, the distance and interactions between object 240$_1$ and object 240$_2$ are used to further update the display data of both virtual object models and their corresponding object model data. For example, the AR system 202 can use information about the relative sizes of the real-world objects, and the proximity of the virtual objects to each other, to further adjust the display data of the virtual object models.

At block 414, the AR system 202 renders the first virtual object model or the first object model data on the display 206 based on the display data. As previously discussed in FIG. 2, the AR system 202 includes an AR generator 222 that can project AR content onto the display 206. The projected AR content of may appear as an overlay that at least partially covers the real-world objects seen through the transparent display 206.

In one embodiment, the first object model data is shown on the display 206 as an overlay to the corresponding real-world object, which can be seen through the display 206. In another embodiment, the AR system 202 is equipped with a camera to capture images of the real-world environment, and determine when visibility conditions are too poor for the real-world object to be seen through the display 206. In such conditions, the AR generator 222 can project the first virtual object model as an overlay to the corresponding real-world object, and project the first object model data as an overlay to the first virtual object model. In this embodiment, the display 206 may be transmissive or opaque.

The method then proceeds to block 404, where the process is repeated as described above. In one embodiment, during each iteration of the method, the display data is updated to ensure that the size, movements, and physical orientation of the virtual object models are accurate in real time.

While the foregoing is directed to embodiments of the present invention, other and further embodiments of the invention may be devised without departing from the basic scope thereof, and the scope thereof is determined by the claims that follow.

What is claimed is:

1. A method comprising:

generating identifying information of a first virtual object based on a RFID tag scan of RFID tags disposed on a corresponding physical object at fixed locations, wherein the generating identifying information comprises generating fixed feature points in a feature points cloud based on RFID tag responses received from the RFID tags disposed on the corresponding physical object at the fixed locations;

obtaining a first virtual object model based on the identifying information of the first virtual object;

generating display data of the first virtual object model relative to a position of an augmented reality system, wherein the display data is generated based at least in part on the fixed feature points;

determining that visibility conditions impede observation of the corresponding physical object; and based on determining that visibility conditions impede observation of the corresponding physical object, rendering the first virtual object model in place of the corresponding physical object on a display based on the display data.

2. The method of claim 1, wherein the display data generated from the fixed feature points comprises at least one of: a size, physical dimension, or physical feature of the physical object.

3. The method of claim 2, wherein the fixed feature points are generated based on at least one of: UUIDs, placements, location coordinates, or relative positional data received from RFID tag responses of the RFID tag scan.

4. The method of claim 1, wherein the first virtual object model includes object model data comprising at least one of: (i) a name or location coordinates of a UUID of an RFID tag, (ii) a distance between two RFID tags, or (iii) an area of structural importance, a material composition, a physical dimension, or a physical feature of the physical object.

5. The method of claim 4, further comprising:

updating the display data of the first virtual object model and the first object model data based on a display position of a second virtual object model.

6. The method of claim 4, wherein upon determining that visibility conditions impede observation of the physical object, the object model data is further rendered, at least in part, on the display as an overlay over the first virtual object model.

7. A system, comprising: a processor;

a display; and memory or storage comprising an algorithm or computer instructions, which when executed by the processor, performs operations comprising:

generating identifying information of a first virtual object based on a RFID tag scan of RFID tags disposed on a corresponding physical object at fixed locations, wherein the generating identifying information comprises generating fixed feature points in a feature points cloud based on RFID tag responses received from the RFID tags disposed on the corresponding physical object at the fixed locations;

obtaining a first virtual object model based on the identifying information of the first virtual object;

generating display data of the first virtual object model relative to a position of an augmented reality system, wherein the display data is generated based at least in part on the fixed feature points;

determining that visibility conditions impede observation of the corresponding physical object; and based on determining that visibility conditions impede observation of the corresponding physical object, rendering the first virtual object model in place of the corresponding physical object on a display based on the display data.

8. The system of claim 7, wherein the display data generated from the fixed feature points comprises at least one of: a size, physical dimension, or physical feature of the physical object.

9. The system of claim 8, wherein the fixed feature points are generated based on at least one of: UUIDs, placements, location coordinates, or relative positional data received from RFID tag responses of the RFID tag scan.

10. The system of claim 7, wherein the first virtual object model includes object model data comprising at least one of: (i) a name or location coordinates of a UUID of an RFID tag, (ii) a distance between two RFID tags, or (iii) an area of structural importance, a material composition, a physical dimension, or a physical feature of the physical object.

11. The system of claim 10, the operation further comprising:

updating the display data of the first virtual object model and the object model data based on a display position of a second virtual object model.

12. The system of claim 10, wherein upon determining that visibility conditions impede observation of the physical object, the object model data is further rendered, at least in part, on the display as an overlay over the first virtual object model.

13. A computer-readable storage medium having computer-readable program code embodied therewith, the computer-readable program code executable by one or more computer processors to perform operations comprising:

generating identifying information of a first virtual object based on a RFID tag scan of RFID tags disposed on a corresponding physical object at fixed locations, wherein the generating identifying information comprises generating fixed feature points in a feature points cloud based on RFID tag responses received from the RFID tags disposed on the corresponding physical object at the fixed locations;

obtaining a first virtual object model based on the identifying information of the first virtual object;

generating display data of the first virtual object model or the first object model relative to a position of an augmented reality system, wherein the display data is generated based at least in part on the fixed feature points;

determining that visibility conditions impede observation of the corresponding physical object; and based on determining that visibility conditions impede observation of the corresponding physical object, rendering the first virtual object model in place of the corresponding physical object on a display based on the display data.

14. The computer program product of claim 13, the display data generated from the fixed feature points comprises at least one of: a size, physical dimension, or physical feature of the physical object.

15. The computer program product of claim 13, wherein the fixed feature points are generated based on at least one of: UUIDs, placements, location coordinates, or relative positional data received from RFID tag responses of the RFID tag scan.

16. The computer program product of claim 13, wherein the first virtual object model includes object mode data comprising at least one of: (i) a name or location coordinates of a UUID of an RFID tag, (ii) a distance between two RFID tags, or (iii) an area of structural importance, a material composition, a physical dimension, or a physical feature of the physical object.

17. The computer program product of claim 16, the operation further comprising:

updating the display data of the first virtual object model and the object model data based on a display position of a second virtual object model.

* * * * *